April 26, 1960                J. W. ASK                2,933,973
APPARATUS FOR MEASURING THE WIDTH OF AN OBJECT
Filed April 26, 1956
Fig. 1
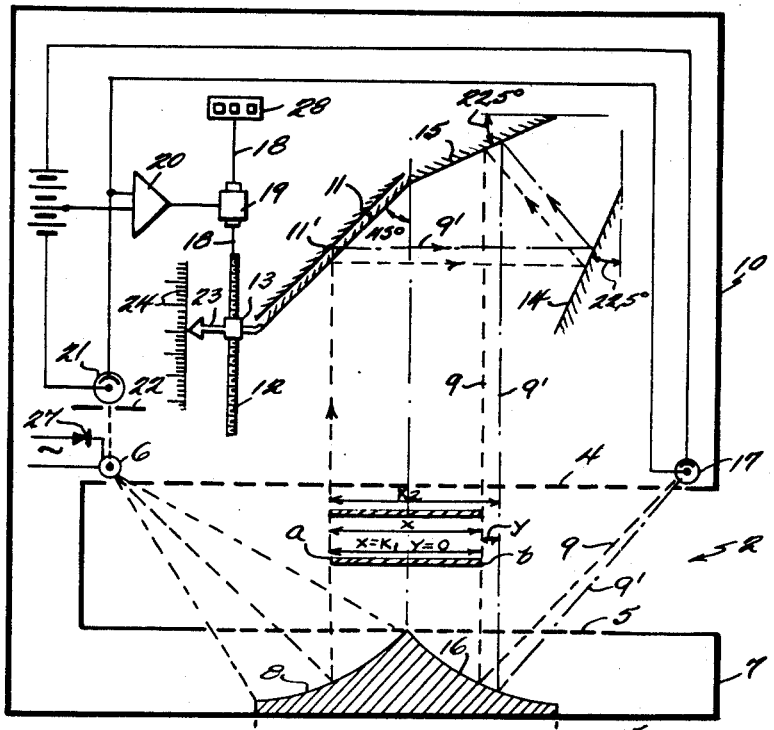
Fig. 2
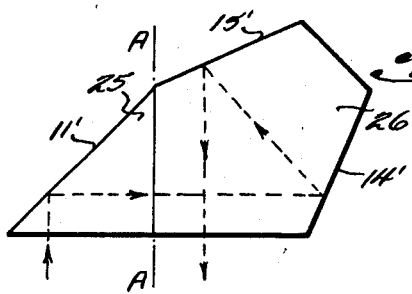
Fig. 3
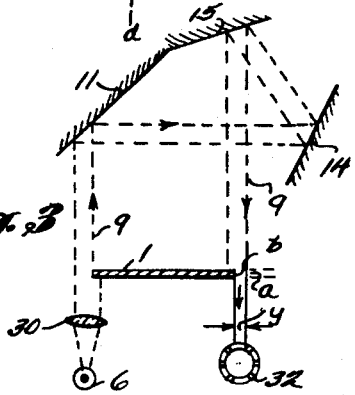
Fig. 4
Fig. 5
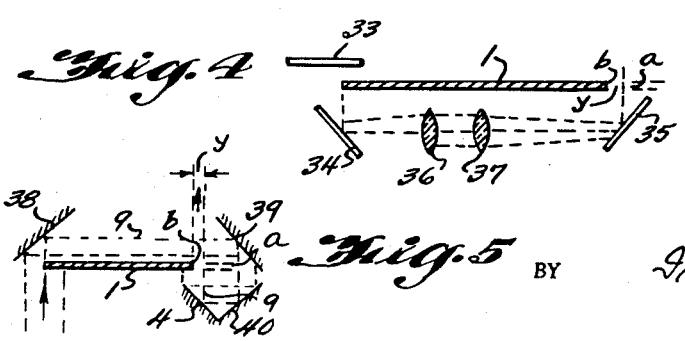
INVENTOR
JONAS W. ASK
BY Irwin S. Thompson
ATTORNEY United States Patent Office 2,933,973
Patented Apr. 26, 1960

2,933,973
APPARATUS FOR MEASURING THE WIDTH OF AN OBJECT

Jonas Waldemar Ask, Mariehall (near Stockholm), Sweden

Application April 26, 1956, Serial No. 580,846

Claims priority, application Sweden October 20, 1955

4 Claims. (Cl. 88—14)

The present invention relates to improved methods of and apparatus for controlling and measuring the width of an object.

The measuring method according to the invention is based on the principle of optically producing adjacent one edge of the object, the width of which is to be controlled or measured, an image of the opposite edge of said object so as to cause a slot to be formed between this image and the real edge of the object. Denoting the width of such slot by $y$, the actual width of the object will be expressed by: $x=k-y$ where $k$ is a constant determined by the optical system.

The width $y$ of the slot can be measured by photoelectric measuring devices known per se, and is subtracted from the constant factor $k$ whereby the width $x$ of the object is obtained. Furthermore, the optical system may be so devised as to enable a preferably automatic adjustment of the slot width to a minimum value, the displacement of the virtual edge of the slot then constituting a measure of the width of the object.

The reproduction of one edge of the object as an image adjacent the other edge thereof may be effected by means of either collimated light and a suitable number of reflecting surfaces (mirrors or prisms), or diffuse light and a suitable combination of reflecting surfaces and lenses.

By producing, according to the invention, adjacent one edge of the object an image of its opposite edge, there will be obtained a slot-shaped illuminated area or "light slot" of uniform light intensity which is delimited at both lateral edges by black areas, i.e. a sharply defined slot will be obtained the width of which may be easily and conveniently measured or utilized for control purposes. The method, in addition, by using correspondingly arranged reflecting surfaces, enables width measurements to be carried out within a large range of varying widths, and within certain limits the measurements will be independent of the localization of the object relative to the measuring device. The measuring method according to the invention may be adopted both for the measurement and control of the width of stationary objects, and for the continuous determination and recording of width variations of moving objects in the course of their production in continuous lengths, such as, for instance, wire and strip materials.

The invention will now be described in greater detail, reference being had to the accompanying drawing illustrating, by way of example only, a few specific embodiments thereof, and in which:

Fig. 1 diagrammatically illustrates an optical width measuring apparatus which enables control and indication of the width, or width variations, of a continuously moving object, such as, for instance, steel strip produced in a rolling mill.

Fig. 2 illustrates a modified form of the optical system used in the apparatus of Fig. 1.

Figs. 3, 4 and 5 illustrate further modified forms of the apparatus.

Referring now to the drawings more specifically, numeral 1 designates the object the width of which is to be measured or controlled, such as, for instance, a moving steel strip (shown in cross-section). The strip 1 is passed through a channel-shaped space 2 formed in the case 3 of the apparatus, and the upper and lower walls of which channel are provided with light permeable portions 4 and 5 (indicated by broken lines). Numeral 6 designates a light source, such as an incandescent lamp having a linear filament. Beams of light emitted by this filament impinge on a mirror 8 parabolically curved in a plane at right angles to the longitudinal axis of the object 1 and disposed in the bottom part 7 of the apparatus, and from which mirror they are reflected as a parallel radiation vertically upward past the left-hand edge $a$ of the object 1. The marginal beam 9 will impinge on a plane mirror 11 disposed in the top part 10 of the apparatus case and at an angle of 45° relatively to the direction of the beams, this mirror 11 being rigidly mounted on a nut 13 in threaded interengagement with a lead screw 12 which is rotatable to enable the mirror 11 to be displaced in the direction of the marginal beam 9. The mirror 11 is adapted to reflect the marginal beam 9 in parallel relation to the width dimension of the object 1 onto a first oppositely disposed plane mirror 14 which reflects the same onto a second plane mirror 15 adapted to reflect the beam downward in spaced parallel relation to its original direction and adjacent to the opposite or right-hand edge $b$ of the object 1 so as to impinge on a second mirror 16 similar to the mirror 8 and also disposed in the bottom part 7 of the apparatus. The mirror 16 is adapted to reflect the beam onto a photoelectric cell 17.

The lead screw 12 is connected to the shaft 18 of a reversible servo-motor 19 which is energized in one sense or the other by the output current of an amplifier 20 the input circuit of which has connected therein in opposition the above-mentioned photoelectric cell 17 and a second photoelectric cell 21 which is energized by light emitted by the light source 6 and passed through a slotted diaphragm 22 having a very narrow slot (such as of the order of magnitude of 0.004 inch). By this means the servo-motor 19 will tend automatically to adjust the plane mirror 11 towards a position in which the quantity of light impinging on the photoelectric cell 21 equals the quantity of light impinging on the photoelectric cell 17, that is to say, in such a manner as to cause the marginal beam 9 always to be situated close to, or in contact with, the right-hand edge $b$ of the object 1. The width variations of the object 1 are indicated on a scale 24 by a pointer 23 associated with the nut 13. They can also be indicated by any suitable counter 28 operatively connected to the motor shaft 18.

In order to reduce distortion due to extraneous light, the amplifier 20, or the photoelectric equipment of the apparatus is suitably so devised as to be sensitive only to light of a particular character, for instance within a particular band of frequencies, or of a predetermined modulation frequency, for instance 50 c./s. In the figure, the filament lamp 6 is supposed to be fed from a 50 c./s. A.C. supply through a rectifier 27.

Among the large number of different optical systems available for carrying the invention into effect, there has been chosen by way of example in Fig. 1 an arrangement including three plane mirrors 11, 14, 15 whereby the following advantages will be obtained, inter alia:

(1) Only a single mirror (mirror 11) will have to be adjusted when the range of measurement is to be altered;

(2) The change in the range of measurement will be symmetrical relative to the longitudinal axis of the object 1 as the mirror 11 is displaced;

(3) The range of lateral variation, i.e. displacement of the object relatively to the center, will amount to ±50% of the width of the object 1, which is true theoretically for any width of the object from zero width up to half the distance between the extreme edges c and d of the mirror system 8, 16.

Since the principle of measurement described hereinbefore is based on a U-shaped embracement of the object 1 to be measured, by a light beam, parts of the elements of the apparatus must necessarily be disposed on both sides of the object. It is preferable to dispose as many elements as possible on one side of the object, and accordingly, as shown in Fig. 1, on the opposite side there is only a simple reflecting and stationary system of mirrors, 8, 16, which is adapted, on one hand, to convert the divergent light beam emitted from the light source 6 into a collimated light beam and, on the other hand, to focus the parallel light beams reflected from the plane mirror 15 onto the photoelectric cell 17.

Concerning the factor $k$, it is not so much a "constant" but rather a "width factor" belonging to distinct adjustment positions of the movable reflecting surface in the optical system. As is clear from the description, the value $k$ is equal to a width greater than the width of the object to be measured, more exactly it is the sum of the width of the object $x$ and of the width of the light slot $y$. In the embodiment shown in Fig. 1, the value $k_1$ is equal to the width of the object $x$, the width of the beam being $y=0$, more precisely so near to zero as to result in the marginal beam 9 shown in this figure. For the sake of clarity now, also another position of the movable reflecting surface 11 has been shown by 11', in which position the width factor $k_2$ equals the sum of $x$ and $y$. As is clear from Fig. 1, the light beam is projected past the edge $a$ of the object, rotated 180°, and displaced transversely of the object, the displacement of the marginal beam 9' being equal to $k$.

In the arrangement shown in Fig. 1 the plane mirrors 11, 14 and 15 may be replaced by two prisms 25 and 26 having reflecting surfaces 11' and 14', 15', respectively, corresponding to the said mirrors, and of which prisms the first-mentioned one, 25, is arranged to be displaceable relative to the last-mentioned one, 26, along a plane A—A which may be their common interengagement plane, as illustrated in Fig. 2.

In Fig. 3 a moving strip-shaped object is again designated by 1. From a light source 6 disposed in spaced relation to one face of this object light beams are emitted which, in a manner similar to that already described, are directed vertically upward at the left-hand edge $a$ of the object 1 so that the marginal beam 9 will impinge on the plane mirror 11 which, in the present instance, is assumed to be stationary. The plane mirror 11 reflects the marginal beam 9 in parallel relation to the width dimension of the object 1 onto a second oppositely positioned plane mirror 14 from which it is returned via a third plane mirror 15 downward in parallel relation to its original upward direction adjacent to the opposite edge $b$ of the object. Since the mirror 11 is assumed to be stationary, the width of the slot $y$ will vary as a function of any width variations of the object 1. Such width variations of the slot may be detected by means of a conventional-type device 32 including a photoelectric cell.

Fig. 4 illustrates a further modified form of the measuring apparatus. Disposed in spaced relation to one face of the strip 1 and in the vicinity of its left-hand edge $a$ is a luminous plate 33. Disposed on the other side of the strip and near the opposite strip edges are inclined plane mirrors 34 and 35 having disposed between them a positive lens, or a positive lens system 36, 37. This lens system together with the plane mirrors 34, 35 will produce an image of the left-hand edge $a$ of the object adjacent to the right-hand edge $b$ of the latter. The width of the slot $y$ may be measured in the manner hereinbefore described in order to detect the width or width variations of the object 1.

Fig. 5, finally, illustrates a modification similar to that according to Fig. 3. However, instead of the three reflecting surfaces 11, 14 and 15 shown in Fig. 3 four such reflecting surfaces 38, 39, 40 and 41 are used. The parallel light beams from a suitable light source are directed vertically upward at the left hand edge $a$ of the object 1 so that the marginal beam 9 will impinge on the surface 38 which reflects the same in parallel relation to the width dimension of the object 1 onto the second reflecting surface 39, which in turn reflects said beam 9 downward onto the third reflecting surface 40. From this third reflecting surface 40 the beam 9 is reflected in horizontal direction onto the fourth reflecting surface 41 which again reflects the beam vertically upward adjacent to the opposite edge $b$ of the object 1. The width $y$ of the slot formed between the edge $b$ and the optically produced image of the edge $a$ can be measured and controlled as stated above.

Various other modifications of the apparatus are conceivable within the scope of the invention.

What I claim is:

1. An apparatus for measuring the width of an opaque object, comprising means for producing a light beam projected past one edge of the object so as to delimit said beam at one side by said object intercepting a portion of the beam, optical system means having light reflecting surfaces for rotating said beam 180° and for parallelly displacing said beam transversely of the object so as to project the beam past the opposite object edge which delimits the beam opposite to said one side for obtaining a distinct beam width, said optical system means having at least one light reflecting surface adjustable for varying said transverse displacement of the beam, and light sensitive means responsive to the width of said beam and controlling said adjustable light reflecting surface so as to keep the width of the beam at a constant value, whereby variations of the position of said adjustable light reflecting surface correspond to width variations of said object.

2. An apparatus for measuring the width of an opaque object, comprising means for producing an uninterrupted light beam projected past one edge of the object, optical system means having light reflecting surfaces for rotating said beam 180° and to parallelly displace the beam transversely of said object so as to be projected past the opposite edge of the object, a portion of said beam being intercepted by both of said edges on opposite sides of the beam so as to leave a beam of distinct width, said optical system means having at least one light reflecting surface adjustable in its position so as to vary said transverse displacement of the beam, light sensitive means responsive to the width of said beam and producing an output voltage dependent on the light amount inherent in said beam width, a second source of relatively fixed voltage, means responsive to the difference of said output voltage and said relatively fixed voltage for displacing said adjustable light reflecting surface in order to keep the width of the light at a constant value, said displacement indicating the relative variation of the width of the object from a predetermined value.

3. An apparatus for measuring the width of an opaque object, comprising means for producing a light beam of collimated light projected past one edge of the object, optical system means having light reflecting surfaces for rotating said beam 180° and having at least one adjustable light reflecting surface for displacing the beam transversely of said object so as to be projected past the opposite edge of the object, a portion of said beam being intercepted by both of said edges on opposite sides of the beam so as to leave a beam of distinct width $y$, the sum of which with the width of the object $x$ is equal to a width factor $k$ depending on the position of said adjustable surface, light sensitive means responsive to the light amount emitted and dependent on the width of said beam and producing an output voltage dependent on said light amount, and means for varying said factor $k$ responsively to the difference of said output voltage relatively to a fixed voltage in order to keep the value $y$ constant, the variation of the factor $k$ corresponding to the variation of the object.

4. An apparatus for measuring the width of an opaque object, comprising means for producing an uninterrupted light beam projected past one edge of the object, optical system means having light reflecting surfaces for rotating said beam 180° and having at least one adjustable surface for displacing the beam transversely of said object so as to be projected past the opposite edge of the object, parallelly opposite portions of said beam being intercepted by passing said opposite edges respectively so as to obtain a beam of distinct width $y$ which added to the width of the object $x$ is equal to a width factor $k$ depending on the position of said adjustable surface, light sensitive means responsive to the beam width and producing an output voltage dependent on said beam width, a second source of a relatively fixed voltage, means responsive to the difference of said output voltage and said relatively fixed voltage, means for keeping said voltage difference independent from variations of the light intensity of the light source, said voltage difference responsive means operating said movable reflecting surface for varying the factor $k$ so as to keep the beam width $y$ at a constant relatively small value, and means responsive to the factor $k$ for indicating the width of the object.

References Cited in the file of this patent

UNITED STATES PATENTS

| | | |
|---|---|---|
| 2,237,811 | Cockrell | Apr. 8, 1941 |
| 2,670,651 | Burns | Mar. 2, 1954 |